(12) United States Patent
Kaul et al.

(10) Patent No.: US 7,519,646 B2
(45) Date of Patent: Apr. 14, 2009

(54) RECONFIGURABLE SIMD VECTOR PROCESSING SYSTEM

(75) Inventors: Himanshu Kaul, Portland, OR (US);
Mark A. Anders, Hillsboro, OR (US);
Sanu Mathew, Hillsboro, OR (US);
Ram Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 294 days.

(21) Appl. No.: 11/586,810

(22) Filed: Oct. 26, 2006

(65) Prior Publication Data
US 2008/0104164 A1    May 1, 2008

(51) Int. Cl.
*G06F 7/52* (2006.01)
(52) U.S. Cl. .................................... 708/620
(58) Field of Classification Search ............. 708/620, 708/625
See application file for complete search history.

(56) References Cited

U.S. PATENT DOCUMENTS

| | | | | |
|---|---|---|---|---|
| 4,594,679 A | * | 6/1986 | George et al. | 708/503 |
| 4,811,269 A | * | 3/1989 | Hirose et al. | 708/627 |
| 4,989,168 A | * | 1/1991 | Kuroda et al. | 708/210 |
| 6,704,762 B1 | * | 3/2004 | Inoue | 708/628 |
| 6,915,322 B2 | * | 7/2005 | Hong | 708/625 |

* cited by examiner

*Primary Examiner*—Tan V Mai
(74) *Attorney, Agent, or Firm*—Buckley, Maschoff & Talwalkar LLC (57) ABSTRACT

A system may include M N-bit×N-bit multipliers to output M 2N-bit products in a redundant format, a compressor to receive the M 2N-bit products and to generate an MN-bit product in a redundant format based on the M 2N-bit products, and an adder block to receive the M 2N-bit products and the MN-bit product, to select one from the M 2N-bit products or the MN-bit product, and to resolve the selected one of the M 2N-bit products or the MN-bit product to a non-redundant format.

16 Claims, 8 Drawing Sheets

RECONFIGURABLE SIMD VECTOR PROCESSING SYSTEM

BACKGROUND

Modern multimedia applications such as video processing, graphics processing and audio processing have considerably increased the performance requirements of consumer-based computing systems. These applications present particular challenges for mobile computing devices, which are subject to stringent power and space restraints.

Single-Instruction-Multiple-Data (SIMD) architectures are commonly used for handling such processing-intensive applications. Multipliers and adders typically comprise the power- and performance-critical components of these architectures. An SIMD architecture may include a configuration of multipliers and adders for handling operands of a fixed bit-width and for providing a fixed degree of parallelism. However, different applications may require different operand bit-widths and/or degrees of parallelism. The SIMD architecture must therefore include a separate configuration of multipliers and adders (i.e., a separate SIMD datapath) to meet the requirements of the different applications.

DETAILED DESCRIPTION

Figure 1:
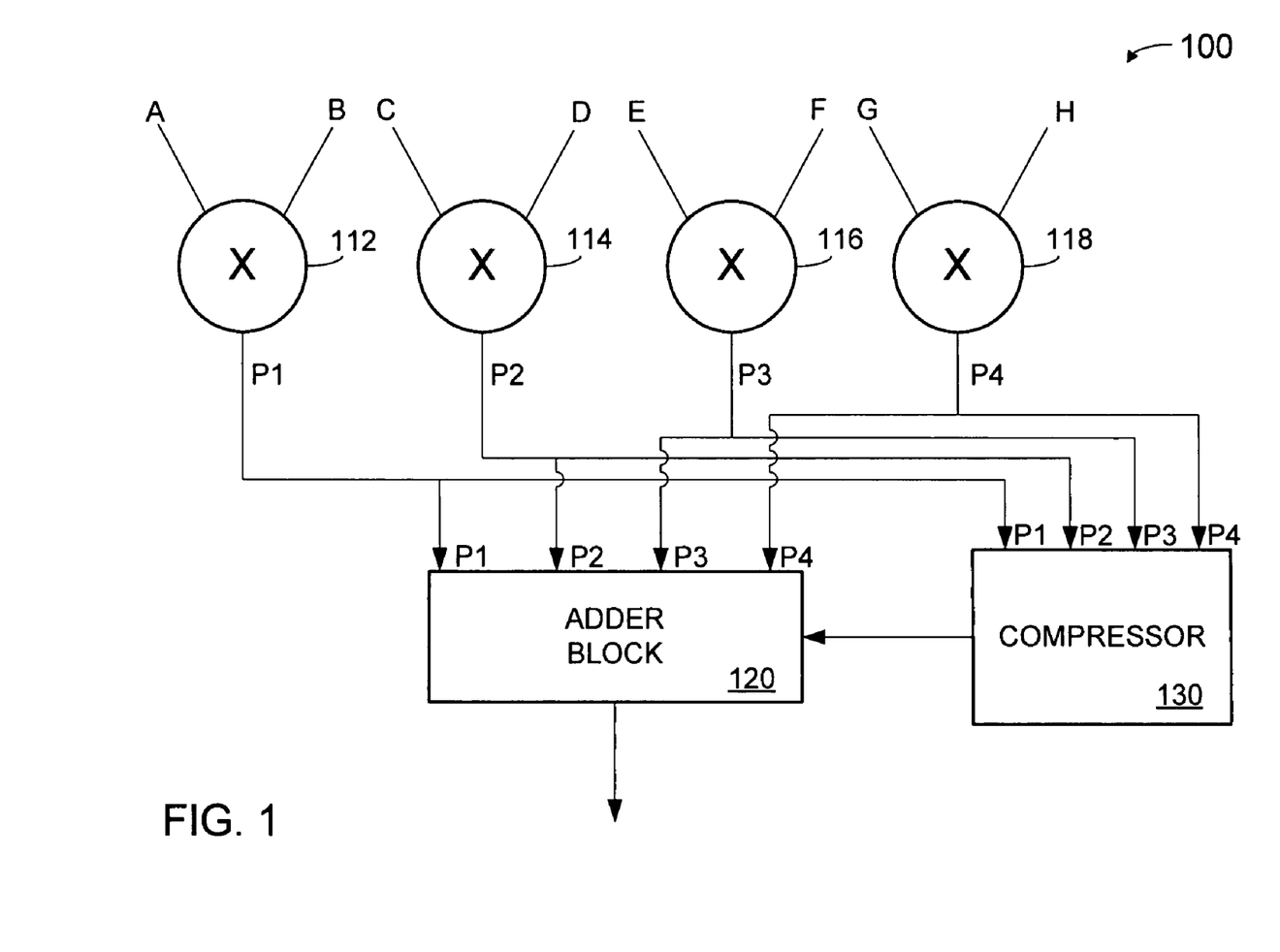
FIG. 1 is a block diagram of a circuit according to some embodiments.

FIG. 1 illustrates circuit 100 according to some embodiments. Circuit 100 may comprise an element of a vector processing circuit. Circuit 100 may be embodied in a functional block of a microprocessor, in dedicated graphics processor, in or any other suitable device(s) that is or becomes known. For example, circuit 100 may be implemented by any combination of discrete devices, integrated circuits, and/or software.

Circuit 100 comprises N×N bit multipliers 112 through 118. Each of N×N bit multipliers 112 through 118 may receive two N-bit operands and may output a 2N-bit product (e.g., P1, P2, P3 and P4) of the two operands. In some embodiments, the 2N-bit products are represented in a redundant format, such as Carry-Save format. Accordingly, each 2N-bit product is represented by 2N Carry bits and 2N Sum bits.

Adder block 120 may receive the 2N-bit products from N×N bit multipliers 112 through 118. Adder block 120 may resolve the 2N-bit products to a non-redundant format such as, but not limited to, 2's complement binary format. Adder block 120 may also receive a 4N-bit product from compressor 130. The 4N-bit product may also be represented in a redundant format, in which case the product is represented by 4N Carry bits and 4N Sum bits. In the latter scenario, adder block 120 may resolve the 4N-bit product to a non-redundant format.

According to some embodiments that will be described in detail below, adder block 120 may also operate as a standalone adder. For example, adder block 120 may receive two numbers in a non-redundant format and selectively add the two numbers to generate a non-redundant sum.

Figure 2:
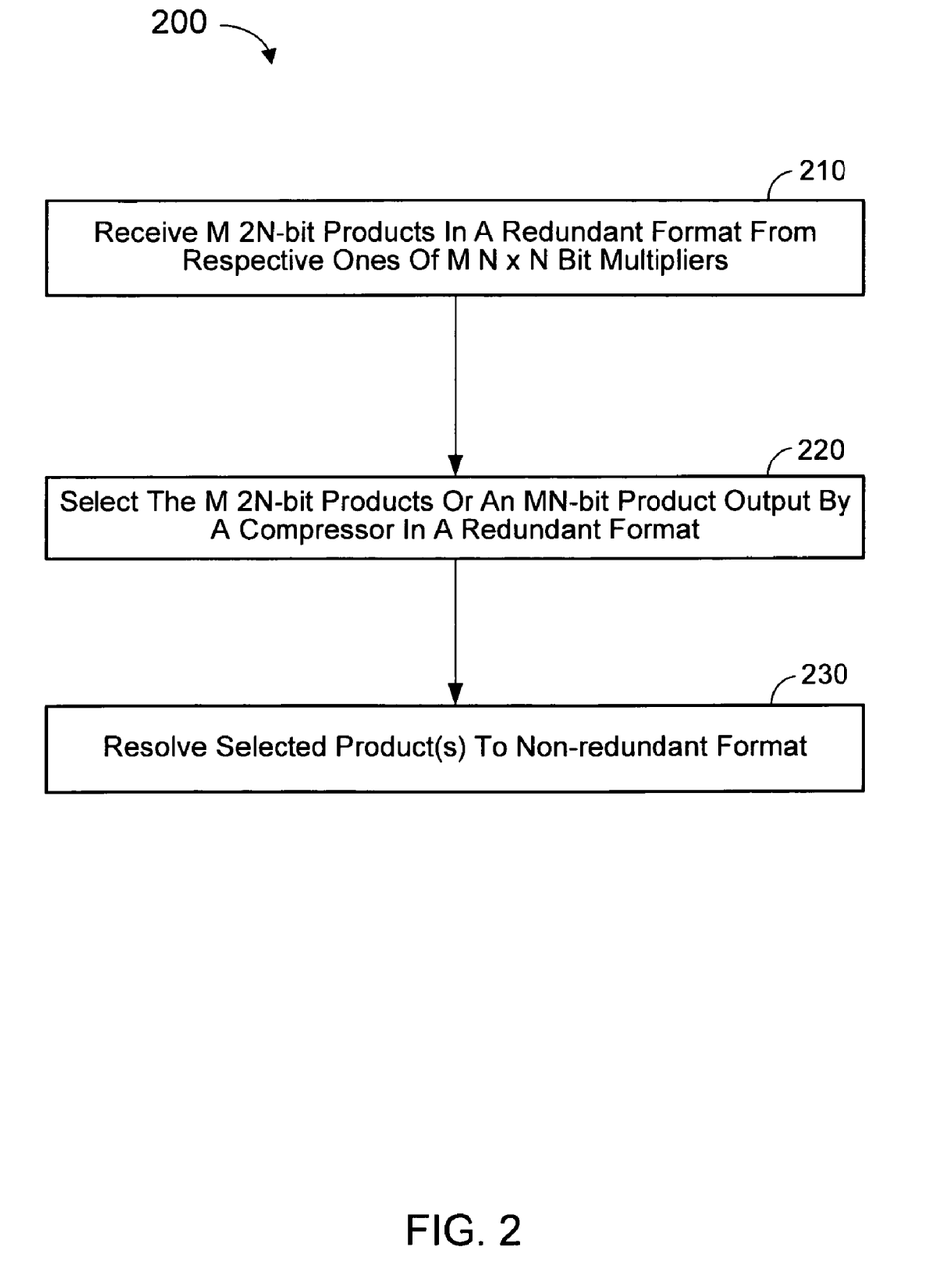
FIG. 2 is a flow diagram of a process according to some embodiments.

FIG. 2 is a flow diagram of process 200 according to some embodiments. Process 200, as well as the other process described herein, may be executed by any system that is or becomes known, including but not limited to circuit 100.

Initially, at 210, M 2N-bit products in a redundant format are received from respective ones of M N×N bit multipliers. Referring to the example of circuit 100, adder block 120 may receive four 2N-bit products P1, P2, P3 and P4 from respective ones of multipliers 112 through 118. Each 2N-bit product may be represented by 2N Carry bits and 2N Sum bits.

Next, at 220, either the M 2N-bit products or an MN-bit product output by a compressor are selected. Continuing with the present example, adder block 120 also receives a 4N-bit product in a redundant format from compressor 130. Adder block 120 then operates to select the M 2N-bit products or the MN-bit product at 220. According to some embodiments, adder block 120 might not always receive both the M 2N-bit products from multipliers 112 through 118 and the MN-bit product from compressor 130. For example, compressor block 130 may be disabled during some periods of operation, in which case adder block 120 might not receive an MN-bit product from compressor 130.

The selected product(s) are resolved to a non-redundant format at 230. Such resolution may simply comprise adding the Carry bits of the selected product(s) to the Sum bits of the selected product(s).

Circuit 100 and process 200, together and separately, may therefore provide reconfigurable SIMD vector processing. Such processing may conserve die area and power dissipation within a suitable device.

Figure 3:
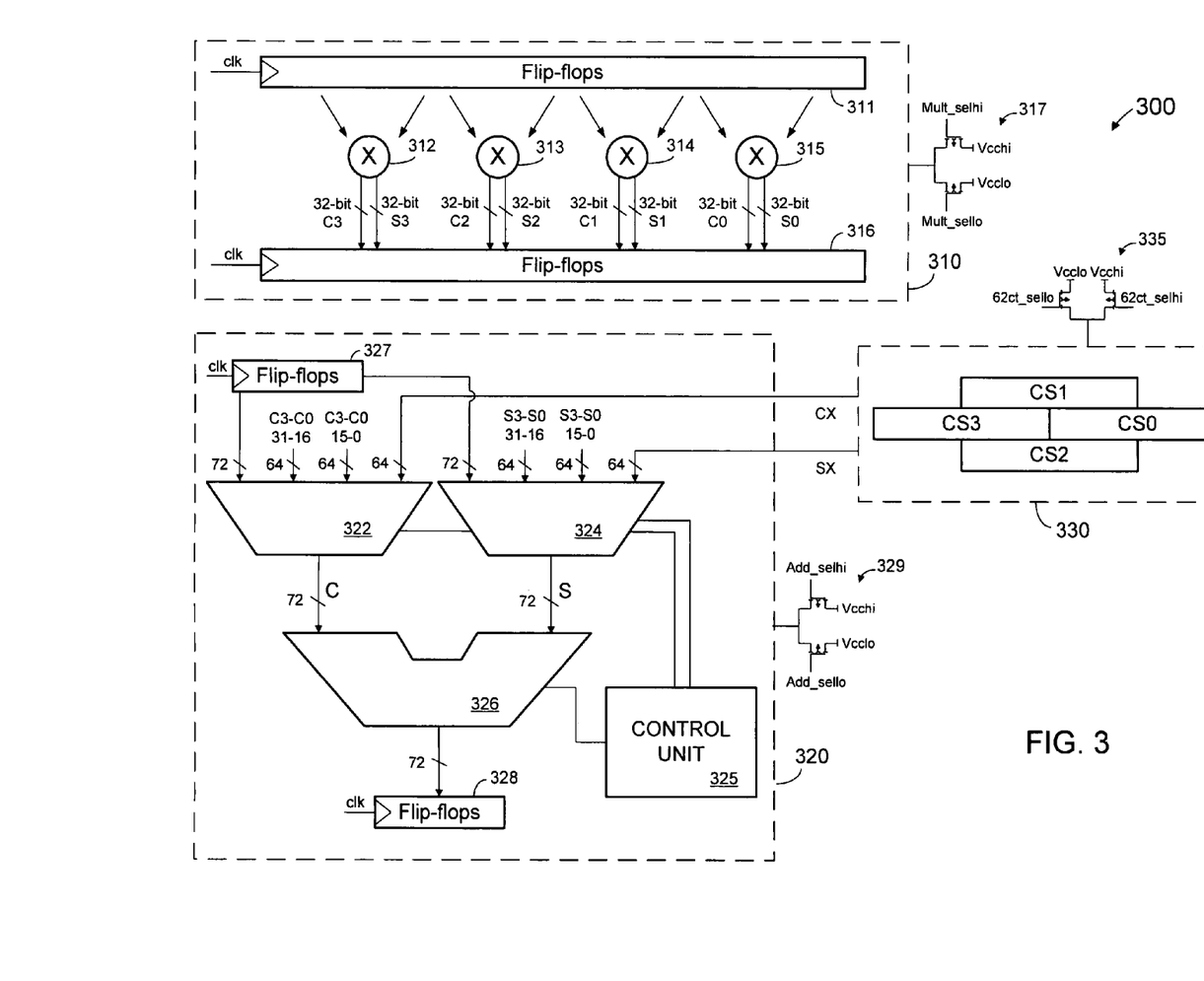
FIG. 3 is a detailed block diagram of a circuit according to some embodiments.

FIG. 3 is detailed block diagram of circuit 300 according to some embodiments. Circuit 300 may comprise an embodiment of circuit 100, and therefore some or all of the characteristics attributed to circuit 100 may apply to circuit 300.

Circuit 300 comprises multiplier 310, adder block 320 and 6:2 compressor 330. Multiplier 310 includes flip-flops 311, four 16×16 bit multipliers 312 through 315, and flip-flops 316. Multiplier 310 receives supply power from multiplier power control circuit 317.

Each of multipliers 312 through 315 receives two 16-bit operands from flip-flops 311 in response to a clock signal clk. Circuit 300 may therefore perform four 16×16 bit multiplications in parallel according to some embodiments. In some embodiments, the two 16-bit operands received by each of multipliers 312 through 315 comprise an upper or lower 16 bits of one of two 32-bit operands. Such embodiments may determine a product of the two 32-bit operands in conjunction with operation of compressor 330 as will be described below.

Multipliers 312 through 315 may comprise signed multipliers. The sign extension of signed multipliers 312 through 315 may be modified depending on whether each multiplier is performing an independent 16-bit×16-bit multiplication or whether signed multipliers 312 through 315 are operating in conjunction with one another to perform a 32-bit×32-bit multiplication as described below. Modification of the sign extension may be controlled by control unit 325. In some embodiments, multipliers 312 through 315 may selectively operate on signed or unsigned operands.

As shown in FIG. 3, each of multipliers 312 through 315 outputs a 32-bit product of its two received 16-bit operands. The products are represented in Carry-Save format. Specifically, each 32-bit product is represented by 32 Carry bits and 32 Sum bits. Flip-flops 316 store the 256 (i.e., 32×2×4) bits in response to a received clock signal clk.

Adder block 320 comprises multiplexer 322 and multiplexer 324. One input of multiplexer 322 receives an upper 16 bits of the 32 Carry bits of each product (C3-C0) stored in flip-flops 316. Accordingly, the input may comprise a 64-bit input. Another input of multiplexer 322 receives a lower 16 bits of the 32 Carry bits of each product (C3-C0) stored in flip-flops 316 and therefore also comprises a 64-bit input. Similarly, one input of multiplexer 324 receives an upper 16 bits of the 32 Sum bits of each product (S3-S0) stored in flip-flops 316, and another input of multiplexer 324 receives a lower 16 bits of the 32 Sum bits of each product (S3-S0) stored in flip-flops 316.

Control unit 325 selects one input line of each of multiplexers 322 and 324. Adder 326 receives and sums the data presented on each selected input line based on a control signal from control unit 325. As will be described below, the control signal may instruct adder 326 to prevent carry propagation at 16-bit or 32-bit boundaries depending on the desired mode of operation. The resulting non-redundant value is stored in flip-flops 328 in response to a received clock signal clk. Adder block 320 receives supply power from adder block power control circuit 329. Adder block power control circuit 329 and multiplier power control circuit may also be controlled by control unit 325 according to some embodiments.

Compressor 330 receives supply power from compressor power control circuit 335, which may also be controlled by control unit 325. Compressor 330 may receive each 32-bit product (CS3-CS0) output by multiplier 310, and may compress the outputs of the multipliers to provide a 64-bit product (CSX) of a 32-bit×32-bit multiplication in Carry-Save format. This compression will be described below in detail with respect to FIGS. 5 and 6.

Multiplexer 322 of adder block 320 receives 64 Carry bits CX of the 64-bit product CSX and multiplexer 324 receives 64 Sum bits SX of CSX. Adder 326 may thereafter sum CX and SX to resolve CSX into a non-redundant format.

Adder block 320 also includes 144-bit flip-flops 327. Flip-flops 327 may output up to a first 72-bits to an input of multiplexer 322 and up to a second 72-bits to an input of multiplexer 324. Accordingly, if these inputs are selected by control unit 325, adder 326 will determine a sum of the first 72-bits and the second 72-bits. As will be described below, parallel addition may be provided by providing more than one operand in each of the first 72-bits and the second 72-bits and by controlling adder 326 to suppress carry propagation at appropriate bit boundaries.

Circuit 300 may provide, in some embodiments, an energy-efficient and reconfigurable SIMD vector processing circuit to operate in at least six different modes with varying degrees of parallelism (e.g., from 1 to 4) and operand bit width (e.g., 16 to 72). For example, circuit 300 may provide four parallel 16-bit×16-bit multiplications or one 32-bit×32-bit multiplication using the same hardware.

Different modes of operation may employ different subsets of the circuit 300. For example, power control circuits 317, 329 and 335 may be controlled to turn off power to elements of circuit 300 that are not required for a particular mode of operation. Additionally or alternatively, power control circuits 317, 329 and 335 may be controlled to provide a reduced supply power (Vcclo) to certain elements that may be associated with relaxed performance requirements in a particular mode. Some embodiments of circuit 300 do not require signals to cross from the Vcclo domain to the Vcchi domain, which may alleviate any need for performance- and power-degrading level shifters within circuit 300.

Figure 4:
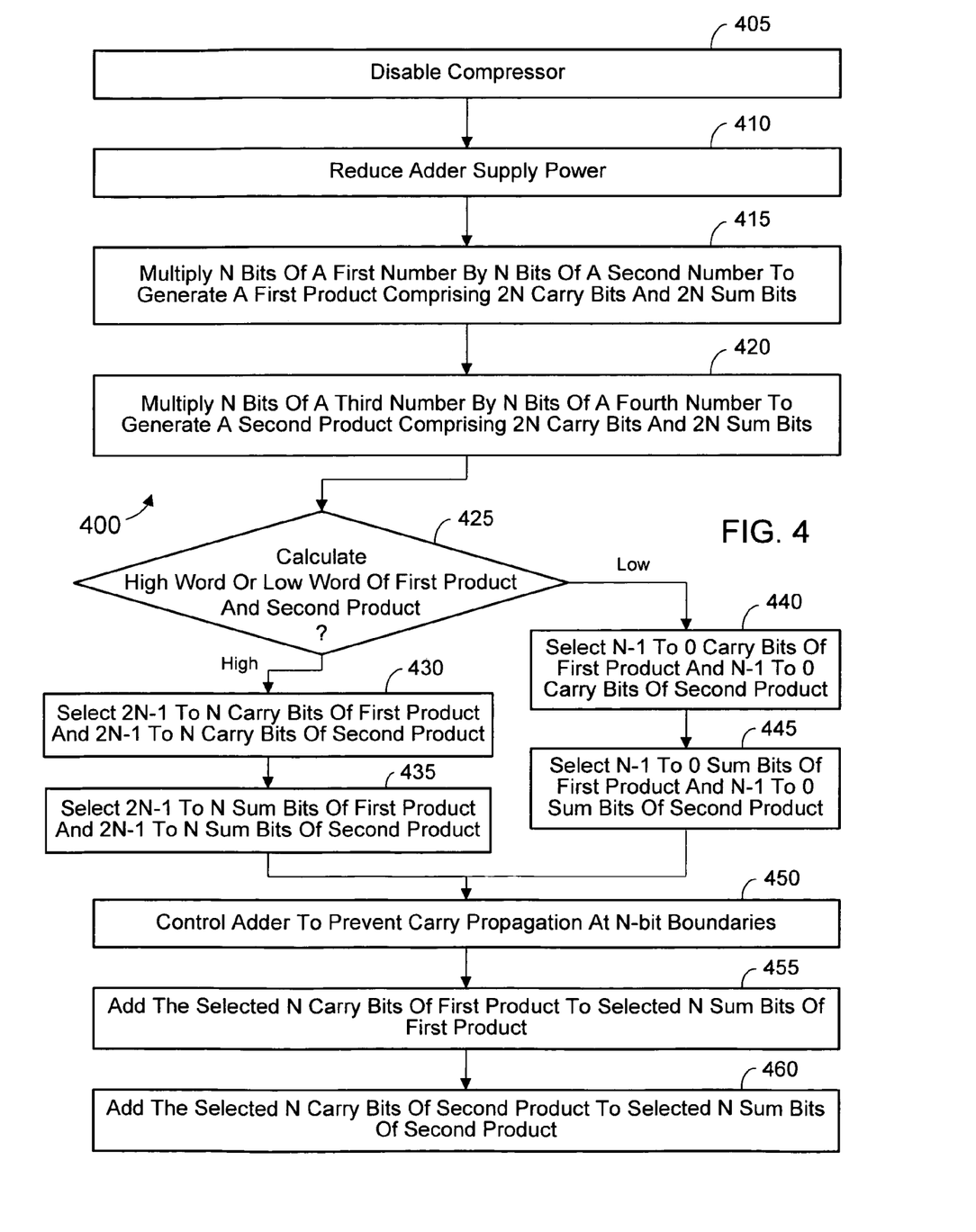
FIG. 4 is a flow diagram of a process according to some embodiments.

FIG. 4 is a detailed flow diagram of process 400 to perform parallel multiplications according to some embodiments. Process 400 may be executed by, for example, circuit 100 and/or circuit 300. Any of the processes described herein may be performed by hardware, software (including microcode), or a combination of hardware and software.

A compressor is initially disabled at 405. Using circuit 300 as an example, compressor 330 may be disabled at 405. In some embodiments, control unit 325 controls the illustrated 62ct_sello and 62ct_selhi signals to open the switches of circuit 335.

Next, an adder power supply is reduced at 410. Disabling compressor 330 reduces a number of gates in the data path of circuit 300. Accordingly, the adder power supply may be reduced in order to maintain an operational frequency of circuit 300 despite the reduced number of gates. Control unit 325 may control the illustrated Add_sello and Add_selhi signals to couple the Vcclo supply power to adder block 320 and to uncouple the Vcchi supply power from block 320.

At 415, N bits of a first number are multiplied by N bits of a second number to generate a first product. The first product includes 2N Carry bits and 2N Sum bits. As an example of 415, multiplier 312 may multiply a first 16-bit number by a second 16-bit number to generate 32 Carry bits C3 and 32 Sum bits S3. Similarly, multiplier 313 may operate at 420 to multiply a third 16-bit number by a fourth 16-bit number to generate 32 Carry bits C2 and 32 Sum bits S2.

Circuit 300 also illustrates similar multiplications performed by multipliers 314 and 315, but process 400 will be explained with reference to only multipliers 312 and 313. Accordingly, some embodiments of process 400 may include only two multiplications.

It is then determined at 425 whether to calculate the high words of the first product and the second product or low words of the first product and the second product. According to the present example, a high word includes an upper N (i.e., 16) bits of a product and a low word includes a lower N bits of the product. Flow proceeds to 430 if the high words are to be determined.

The determination at 425 may be performed by control unit 325. If the high words are to be determined, control unit 325 may control multiplexer 322 at 430 to select the C3-C0, 32-16 input. Control unit 325 may also control multiplexer 324 to select the S3-S0, 32-16 input at 435.

If the low words are to be determined, flow proceeds to 440. Control unit 325 may control multiplexer 322 at 440 to select the C3-C0, 15-0 input. At 445, control unit 325 may control multiplexer 324 to select the S3-S0, 15-0 input.

Next, at 450 an adder is controlled to prevent carry propagation at N-bit boundaries. Such control may allow the adder to perform parallel add operations. Control unit 325 may control adder 326 to prevent carry propagations at 16-bit boundaries according to some embodiments.

The selected N carry bits of the first product are added to the selected N Sum bits of the first product at 455. For example, if a high word is to be determined, the selected upper 16 Carry bits of first product CS3 are received from multiplexer 322 and are added to the selected upper 16 Sum bits of first product CS3 that are received from multiplexer 324. This operation may generate the first product in a non-redundant format.

The selected N carry bits of the second product are added to the selected N Sum bits of the second product at 460. If a low word is to be determined, the lower 16 Carry bits of first product CS3 are received from multiplexer 322 and the lower 16 Sum bits of first product CS3 are received from multiplexer 324. The received bits are added to generate the second product in a non-redundant format.

The addition at 455 and 460 may be carried out simultaneously. In particular, the bits selected at 430/435 or 440/445 may be simultaneously received over the two 72-bit inputs of adder 326. Adder 326 may then perform a 72-bit addition, without carry propagation at 16-bit boundaries, to execute the addition at 455 and 460.

Figure 5:
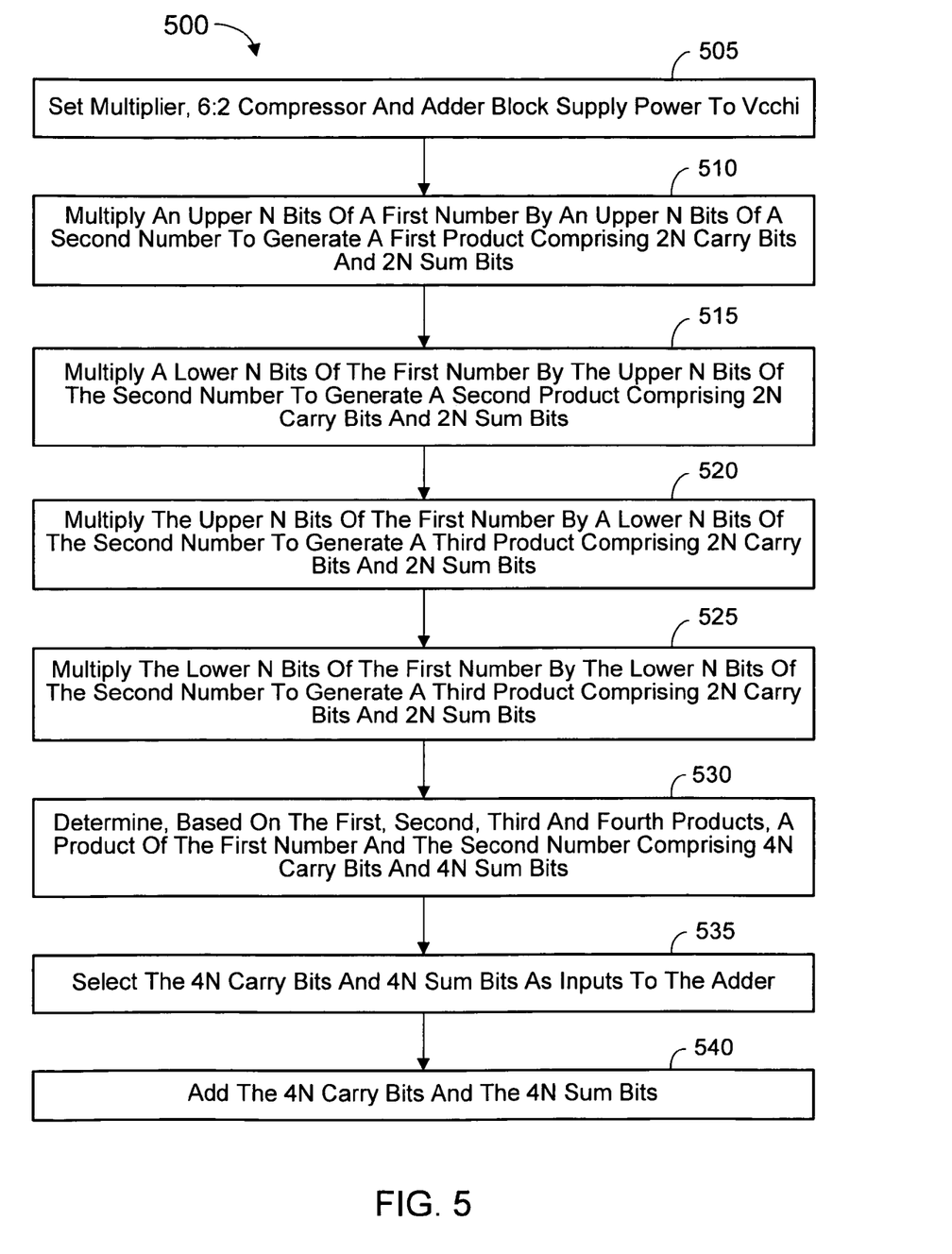
FIG. 5 is a flow diagram of a process according to some embodiments.

FIG. 5 is a flow diagram of process 500 to perform a 2N-bit×2N-bit multiplication according to some embodiments. Initially, at 505, a supply power to a multiplier, compressor and adder block is set to Vcchi. This supply power may maximize performance and power consumption. This supply power may also allow circuit to operate at a same frequency as exhibited in a case that compressor 330 is disabled. In some embodiments of 505, control unit 325 controls circuits 317, 335 and 329 to couple the Vcchi supply power to multiplier 310, adder block 320, and compressor 330.

At 510, an upper N bits of a first number are multiplied by an upper N bits of a second number to generate a first product. The first product includes 2N Carry bits and 2N Sum bits. For purposes of the present example, the first number will be represented as $X_1X_0$ and the second number will be represented as $Y_1Y_0$. The upper N bits of the first number and the upper N bits of the second number may therefore be represented as $X_1$ and $Y_1$, respectively, and the first product is $X_1Y_1$.

A lower N bits of the first number are multiplied by the upper N bits of the second number to generate a second product at 515. Continuing with the current example, the second product $X_0Y_1$ and is represented by 2N Carry bits and 2N Sum bits. The upper N bits of the first number are multiplied by a lower N bits of the second number to generate a third product $X_1Y_0$ at 520, and the lower N bits of the first number are multiplied by a lower N bits of the second number to generate a fourth product $X_0Y_0$ at 525.

Referring to FIG. 3, $X_1$ and $Y_1$ may be stored in flip-flop 311 so as to be output to multiplier 312 in response to a clock signal. Similarly, $X_0$ and $Y_1$ may be stored in flip-flop 311 so as to be output to multiplier 313, $X_1$ and $Y_0$ may be stored in flip-flop 311 so as to be output to multiplier 314, and $X_0$ and $Y_0$ may be stored in flip-flop 311 so as to be output to multiplier 315. The multiplications of 510 through 525 may therefore be performed in parallel by multipliers 312 through 315, and the resulting products $X_1Y_1$, $X_0Y_1$, $X_1Y_0$, and $X_0Y_0$ may be represented by Carry-Save bits CS3, CS2, CS1 and CS0, respectively.

Next, a product of the first number and the second number is determined at 530. The determination is based on the first, second, third and fourth products. Moreover, the determined product is represented by 4N Carry bits and 4N sum bits.

With respect to the present example, a product of $X_1X_0$ and $Y_1Y_0$ is determined at 530. The determined product is based on products $X_1Y_1$, $X_0Y_1$, $X_1Y_0$, and $X_0Y_0$, which, as described above, are represented by Carry-Save bits CS3, CS2, CS1 and CS0, respectively. Compressor 330 of FIG. 3 generally illustrates how a product of $X_1X_0$ and $Y_1Y_0$ is determined based on Carry-Save bits CS3, CS2, CS1 and CS0 according to some embodiments.

Figure 6:
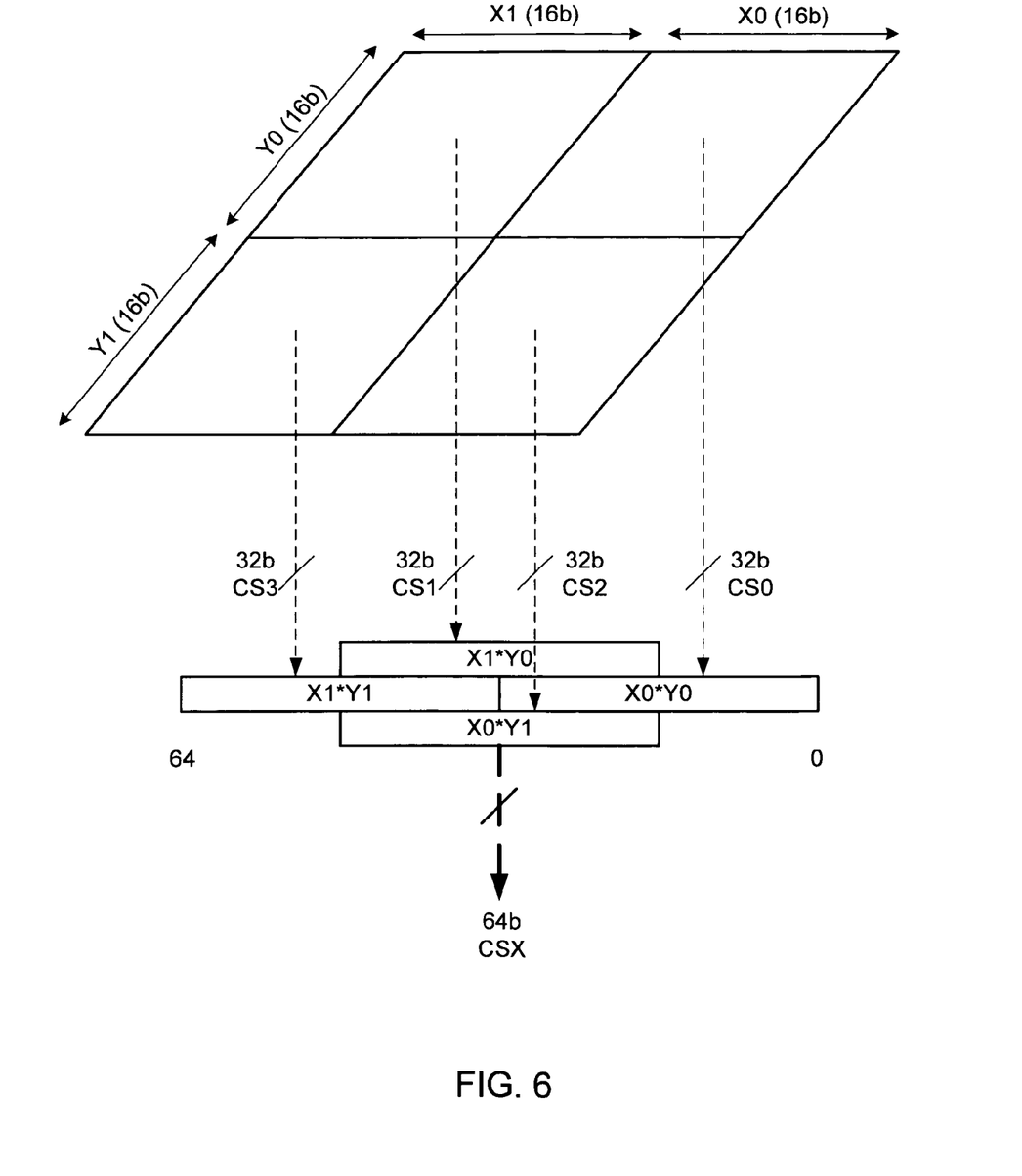
FIG. 6 illustrates the determination of a product from sub-products according to some embodiments.

FIG. 6 is a more detailed illustration of the determination of 530 according to some embodiments. FIG. 6 illustrates the determination of the 4N Carry bits and 4N Sum bits of the product CSX. As shown, 32-bit CS3, 32-bit CS2, 32-bit CS1, and 32-bit CS0, each representing a different one of products $X_1Y_1$, $X_0Y_1$, $X_1Y_0$, and $X_0Y_0$, are aligned across a 64-bit address space. Bits 15-0 of the address space consist of the lower 16-bits of CS0, while bits 63-48 of the address space consist of the upper 16-bits of CS3. Bits 47-32 of the address space consist of a combination of bits CS1, CS3 and CS2, while bits 31-16 of the address space consist of a combination of bits CS1, CS0 and CS2.

The 4N Carry bits and the 4N Sum bits are selected as inputs to an adder at 535. For example, compressor 330 outputs Carry bits CX and Sum bits SX to multiplexers 322 and 324, and, at 535, control unit 325 controls multiplexers 322 and 324 to select the associated inputs. Adder 326 then adds the received 128 bits (i.e., 64 Carry and 64 Sum) to generate a product of $X_1X_0$ and $Y_1Y_0$ in a non-redundant format.

Figure 7:
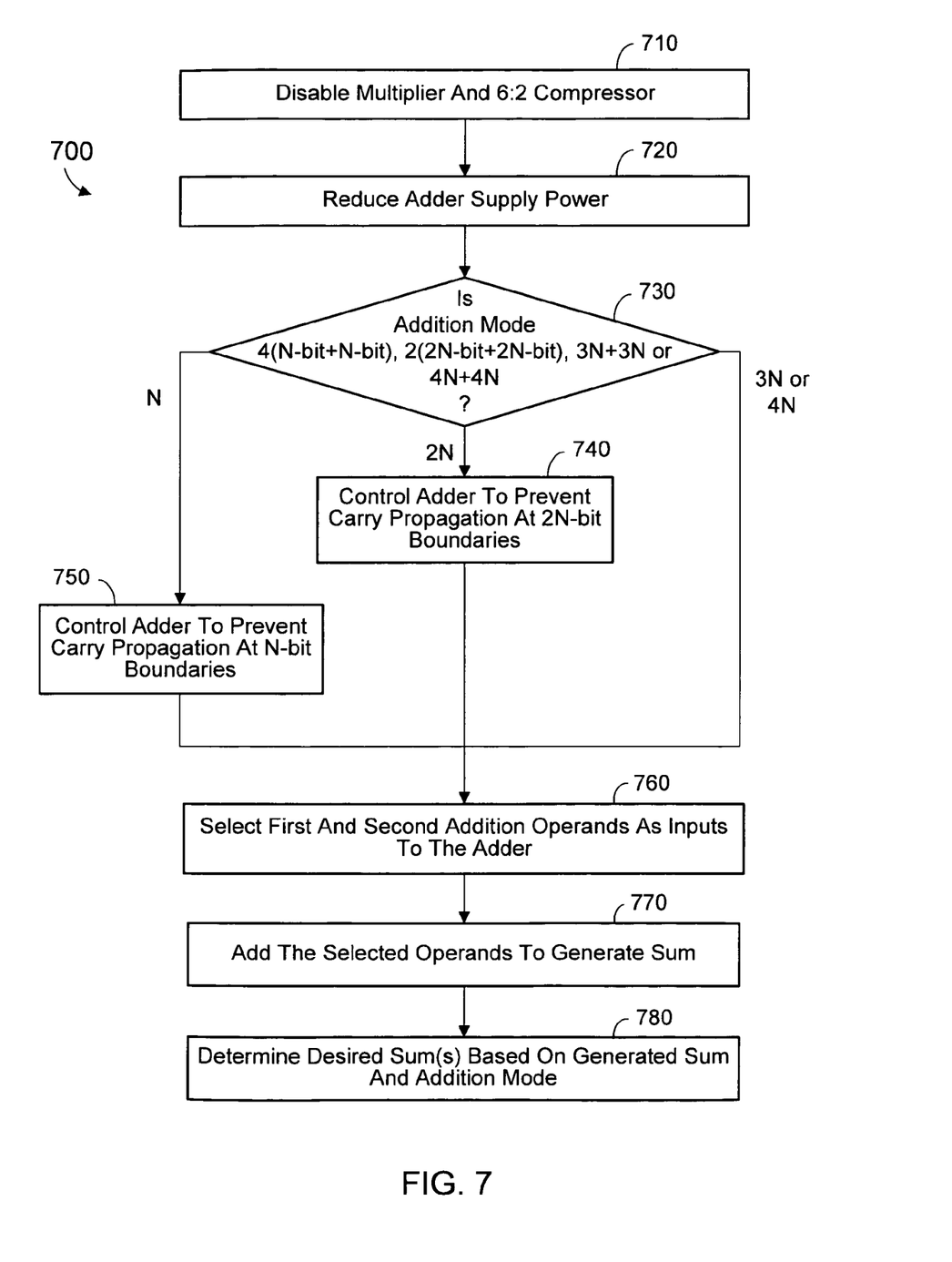
FIG. 7 is a flow diagram of a process according to some embodiments.

FIG. 7 is a flow diagram of process 700 to perform addition with various degrees of parallelism according to some embodiments. A multiplier and a compressor are disabled at 710 and an adder power supply is reduced at 720. The adder power supply is reduced to maintain a desired operational frequency despite the reduction of gates in the data path caused by disabling the compressor and the multiplier.

Control unit 325 may disable the multiplier and the compressor at 710 by opening the switches of circuit 317 and circuit 335. In some embodiments of 720, control unit 325 controls the Add_sello and Add_selhi signals to couple the Vcclo supply power to adder block 320 and to uncouple the Vcchi supply power from block 320.

An addition mode is determined at 730. According to process 700, possible addition modes include four N-bit+N-bit addition operations, two 2N-bit+2N-bit addition operations, one 3N-bit+3N-bit operation, and one 4N-bit+4N-bit addition operation. Flip-flops 327 may store the operands of the desired mode in a non-redundant (e.g., binary) format.

By way of example, it is assumed that the addition mode is determined by control unit 325 to require four N-bit+N-bit addition operations. Accordingly, flip-flops 327 store four 16-bit operands for output to an input of multiplexer 322 and four 16-bit operands for output to an input of multiplexer 324. Moreover, flow proceeds to 740, where an adder is controlled to prevent carry propagation at N-bit boundaries. Control unit 325 may control adder 326 at 740 to prevent carry propagations at 16-bit boundaries according to some embodiments.

First and second addition operands are selected as inputs to the adder at 760. For example, control unit 325 may control multiplexer 322 at 760 to select the 72-bit input coupled to flip-flops 327, and may also control multiplexer 324 to select its 72-bit input coupled to flip-flops 327. The 72-bit input coupled to multiplexer 322 may include four 16-bit operands, each of which is to be added to a respective one of four 16-bit operands of a 72-bit input coupled to multiplexer 32.

The first and second operands are added at 770 to generate a sum. In the currently-selected addition mode, the addition at 770 is performed while preventing carry propagation at 16-bit boundaries. Accordingly, the four desired sums may be determined from four 16-bit portions of the 72-bit sum. Specifically, a first 16 bits of the 72-bit sum represents a first desired sum, a second 16 bits of the 72-bit sum represents a second desired sum, a third 16 bits of the 72-bit sum represents a third desired sum, and a fourth 16 bits of the 72-bit sum represents a fourth desired sum.

Flow proceeds from 730 to 750 in a case that the determined addition mode requires two 2N-bit+2N-bit addition operations. At 750, the adder is controlled to prevent carry propagation at 2N-bit boundaries. Moreover, flip-flops 327 store two 32-bit operands for output to an input of multiplexer 322 and two 32-bit operands for output to an input of multiplexer 324. These inputs to multiplexers 322 and 324 are selected and added at 760 and 770, and the two desired sums are determined therefrom at 780. Particularly, a first 32 bits of the generated 72-bit sum represents a first desired sum, and a second 32 bits of the 72-bit sum represents a second desired sum.

If the determined addition mode requires one 3N-bit+3N-bit or one 4N-bit+4N-bit addition operation, flow proceeds directly from 730 to 760. Accordingly, carry propagation within adder is not prevented. Flip-flops 327 store a 48-bit or 64-bit operand for output to an input of multiplexer 322 and a 48-bit or 64-bit operand for output to an input of multiplexer 324. These inputs to multiplexers 322 and 324 are selected at 760 and a sum is generated at 770. The desired sum is determined to be equal to the generated sum at 780. As illustrated in FIG. 3, adder 326 can support operands up to 72-bits in length.

Figure 8:
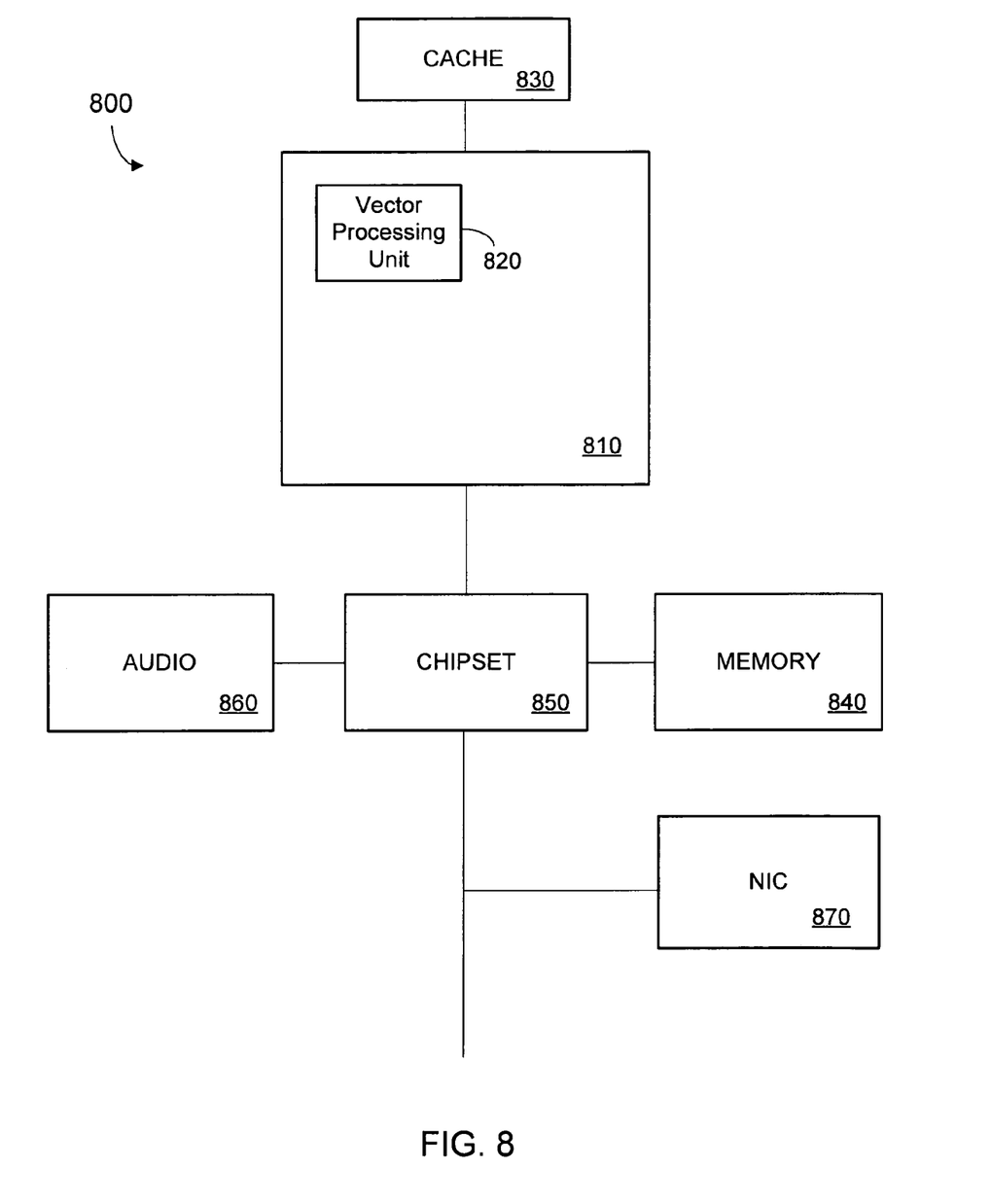
FIG. 8 is a block diagram of a system according to some embodiments.

FIG. 8 illustrates a block diagram of system 800 according to some embodiments. System 800 includes integrated circuit 810 which may be a microprocessor or another type of integrated circuit. Integrated circuit 810 includes vector processing engine 820 embodied in any suitable form. Vector processing engine 820 may embody circuit 100, circuit 300, and/or any of the processes described herein.

Integrated circuit 810 also communicates with off-die cache 830. Off-die cache 830 may include registers storing operands for input to vector processing engine 820. Integrated circuit 810 may also communicate with system memory 840 via a host bus and a chipset 850. Memory 840 may comprise any suitable type of memory, including but not limited to Single Data Rate Random Access Memory and Double Data Rate Random Access Memory. In addition, other off-die functional units, such as audio processor 860 and Network Interface Controller (NIC) 870 may communicate with integrated circuit 810 via appropriate busses.

The several embodiments described herein are solely for the purpose of illustration. Therefore, persons in the art will recognize from this description that other embodiments may be practiced with various modifications and alterations.

What is claimed is:

1. A circuit comprising:
   M N-bit×N-bit multipliers to output M 2N-bit products in a redundant format;
   a compressor to receive the M 2N-bit products and to generate an MN-bit product in a redundant format based on the M 2N-bit products; and
   an adder block to receive the M 2N-bit products and the MN-bit product, to select one from the M 2N-bit products or the MN-bit product, and to resolve the selected one of the M 2N-bit products or the MN-bit product to a non-redundant format.

2. A circuit according to claim 1,
   wherein a first 2N-bit product of the M 2N-bit products is a product of an upper N-bits of a first number and an upper N-bits of a second number,
   wherein a second 2N-bit product of the M 2N-bit products is a product of a lower N-bits of the first number and the upper N-bits of the second number,
   wherein a third 2N-bit product of the M 2N-bit products is a product of the upper N-bits of the first number and a lower N-bits of the second number,
   wherein a fourth 2N-bit product of the M 2N-bit products is a product of the lower N-bits of the first number and the lower N-bits of the second number, and
   wherein the MN-bit product generated by the compressor is equal to the first number multiplied by second number.

3. A circuit according to claim 2,
   wherein the adder block is further to select MN-bit carry bits of the MN-bit product, to select MN-bit sum bits of the MN-bit product, and to add the selected MN-bit carry bits and MN-bit sum bits to resolve the MN-bit product to a non-redundant format.

4. A circuit according to claim 1, wherein, in a first mode, the adder block is to
   receive an upper N carry bits and an upper N sum bits of a first 2N-bit product of the M 2N-bit products, and an upper N carry bits and an upper N sum bits of a second 2N-bit product of the M 2N-bit products,
   select the upper N carry bits of the first 2N-bit product and the second 2N-bit product and the upper N sum bits of the first 2N-bit product and the second 2N-bit product, or the lower N carry bits of the first 2N-bit product and the second 2N-bit product and the lower N sum bits of the first 2N-bit product and the second 2N-bit product,
   add the selected N carry bits of the first 2N-bit product and the selected N sum bits of the first 2N-bit product, and
   add the selected N carry bits of the second 2N-bit product and the selected N sum bits of the second 2N-bit product.

5. A circuit according to claim 4, wherein, in the first mode, the adder block is to
   prevent carry propagation at N-bit boundaries.

6. A circuit according to claim 1, the adder block further to
   receive a first MN-bit number and a second MN-bit number in binary format,
   determine whether the first MN-bit number and the second MN-bit number each represent one, M/2 or M separate operands,
   prevent carry propagation at N-bit boundaries if it is determined that the first MN-bit number and the second MN-bit number each represent M separate operands,
   prevent carry propagation at 2N-bit boundaries if it is determined that the first MN-bit number and the second MN-bit number each represent M/2 separate operands,
   add the first MN-bit number and the second MN-bit number to generate a sum, and
   determine one or more desired sums based on the generated sum and on whether the first MN-bit number and the second MN-bit number each represent one, M/2 or M separate operands.

7. A method comprising:
   receiving M 2N-bit products in a redundant format from respective ones of M N-bit×N-bit multipliers of a vector processing circuit at a compressor of the vector processing circuit;
   selecting one from the M 2N-bit products or an MN-bit product output from a compressor in a redundant format; and
   resolving the selected one of the M 2N-bit products or the MN-bit product to a non-redundant format at an adder block of the vector processing circuit.

8. A method according to claim 7,
   wherein a first 2N-bit product of the M 2N-bit products is a product of an upper N-bits of a first number and an upper N-bits of a second number,
   wherein a second 2N-bit product of the M 2N-bit products is a product of a lower N-bits of the first number and the upper N-bits of the second number,
   wherein a third 2N-bit product of the M 2N-bit products is a product of the upper N-bits of the first number and a lower N-bits of the second number,
   wherein a fourth 2N-bit product of the M 2N-bit products is a product of the lower N-bits of the first number and the lower N-bits of the second number, and wherein the MN-bit product generated by the compressor is equal to the first number multiplied by second number.

9. A method according to claim 8, wherein selecting one from the M 2N-bit products or the MN-bit product comprises:
selecting MN-bit carry bits of the MN-bit product; and selecting MN-bit sum bits of the MN-bit product, and
wherein resolving the selected one of the M 2N-bit products or the MN-bit product to the non-redundant format comprises:
adding the selected MN-bit carry bits and MN-bit sum bits to resolve the MN-bit product to the non-redundant format.

10. A method according to claim 7, wherein selecting one from the M 2N-bit products or the MN-bit product comprises:
receiving an upper N carry bits and an upper N sum bits of a first 2N-bit product of the M 2N-bit products, and an upper N carry bits and an upper N sum bits of a second 2N-bit product of the M 2N-bit products,
selecting the upper N carry bits of the first 2N-bit product and the second 2N-bit product and the upper N sum bits of the first 2N-bit product and the second 2N-bit product, or the lower N carry bits of the first 2N-bit product and the second 2N-bit product and the lower N sum bits of the first 2N-bit product and the second 2N-bit product, and
wherein resolving the selected one of the M 2N-bit products or the MN-bit product to the non-redundant format comprises:
adding the selected N carry bits of the first 2N-bit product and the selected N sum bits of the first 2N-bit product; and
adding the selected N carry bits of the second 2N-bit product and the selected N sum bits of the second 2N-bit product.

11. A method according to claim 10, wherein adding the selected N carry bits of the first 2N-bit product and the selected N sum bits of the first 2N-bit product comprises preventing carry propagation at N-bit boundaries.

12. A method according to claim 7,
wherein the receiving further comprises receiving a first MN-bit number and a second MN-bit number in binary format, and
wherein resolving the selected one of the M 2N-bit products or the MN-bit product to a non-redundant format comprises:
determining whether the first MN-bit number and the second MN-bit number each represent one, M/2 or M separate operands;
preventing carry propagation at N-bit boundaries if it is determined that the first MN-bit number and the second MN-bit number each represent M separate operands;
preventing carry propagation at 2N-bit boundaries if it is determined that the first MN-bit number and the second MN-bit number each represent M/2 separate operands;
adding the first MN-bit number and the second MN-bit number to generate a sum; and
determining one or more desired sums based on the generated sum and on whether the first MN-bit number and the second MN-bit number each represent one, M/2 or M separate operands.

13. A system comprising:
a processor comprising:
M N-bit×N-bit multipliers to output M 2N-bit products in a redundant format;
a compressor to receive the M 2N-bit products and to generate an MN-bit product in a redundant format based on the M 2N-bit products; and
an adder block to receive the M 2N-bit products and the MN-bit product, to select one from the M 2N-bit products or the MN-bit product, and to resolve the selected one of the M 2N-bit products or the MN-bit product to a non-redundant format; and
a double data rate memory coupled to the processor.

14. A system according to claim 13,
wherein a first 2N-bit product of the M 2N-bit products is a product of an upper N-bits of a first number and an upper N-bits of a second number,
wherein a second 2N-bit product of the M 2N-bit products is a product of a lower N-bits of the first number and the upper N-bits of the second number,
wherein a third 2N-bit product of the M 2N-bit products is a product of the upper N-bits of the first number and a lower N-bits of the second number,
wherein a fourth 2N-bit product of the M 2N-bit products is a product of the lower N-bits of the first number and the lower N-bits of the second number,
wherein the MN-bit product generated by the compressor is equal to the first number multiplied by second number, and
wherein the adder block is further to select MN-bit carry bits of the MN-bit product, to select MN-bit sum bits of the MN-bit product, and to add the selected MN-bit carry bits and MN-bit sum bits to resolve the MN-bit product to a non-redundant format.

15. A system according to claim 13, wherein, in a first mode, the adder block is to
receive an upper N carry bits and an upper N sum bits of a first 2N-bit product of the M 2N-bit products, and an upper N carry bits and an upper N sum bits of a second 2N-bit product of the M 2N-bit products,
select the upper N carry bits of the first 2N-bit product and the second 2N-bit product and the upper N sum bits of the first 2N-bit product and the second 2N-bit product, or the lower N carry bits of the first 2N-bit product and the second 2N-bit product and the lower N sum bits of the first 2N-bit product and the second 2N-bit product,
add the selected N carry bits of the first 2N-bit product and the selected N sum bits of the first 2N-bit product,
add the selected N carry bits of the second 2N-bit product and the selected N sum bits of the second 2N-bit product, and
prevent carry propagation at N-bit boundaries.

16. A system according to claim 13, the adder block further to
receive a first MN-bit number and a second MN-bit number in binary format,
determine whether the first MN-bit number and the second MN-bit number each represent one, M/2 or M separate operands,
prevent carry propagation at N-bit boundaries if it is determined that the first MN-bit number and the second MN-bit number each represent M separate operands, prevent carry propagation at 2N-bit boundaries if it is determined that the first MN-bit number and the second MN-bit number each represent M/2 separate operands, add the first MN-bit number and the second MN-bit number to generate a sum, and determine one or more desired sums based on the generated sum and on whether the first MN-bit number and the second MN-bit number each represent one, M/2 or M separate operands.

* * * * *